United States Patent
Hadap et al.

(10) Patent No.: US 12,070,093 B1
(45) Date of Patent: Aug. 27, 2024

(54) CUSTOM GARMENT PATTERN BLENDING BASED ON BODY DATA

(71) Applicant: Amazon Technologies, Inc., Seattle, WA (US)

(72) Inventors: Sunil Sharadchandra Hadap, Dublin, CA (US); Nancy Yi Liang, Seattle, WA (US); Zoe Rachel Sherman, Kingston, WA (US); Vidya Narayanan, Pittsburgh, PA (US); Raja Bala, Pittsford, NY (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 17/693,093

(22) Filed: Mar. 11, 2022

(51) Int. Cl.
*A41H 3/00* (2006.01)
*G06F 30/10* (2020.01)
*G06F 111/16* (2020.01)
*G06F 111/02* (2020.01)

(52) U.S. Cl.
CPC ............. *A41H 3/007* (2013.01); *G06F 30/10* (2020.01); *G06F 2111/02* (2020.01); *G06F 2111/16* (2020.01)

(58) Field of Classification Search
None
See application file for complete search history.

(56) References Cited

U.S. PATENT DOCUMENTS

| | | | | |
|---|---|---|---|---|
| 5,163,006 A | * | 11/1992 | Deziel | A41H 3/007 700/87 |
| 5,530,652 A | * | 6/1996 | Croyle | A41H 1/02 356/612 |
| 6,546,309 B1 | * | 4/2003 | Gazzuolo | G06T 17/20 702/167 |
| 7,016,882 B2 | * | 3/2006 | Afeyan | G06Q 30/02 706/13 |

(Continued)

FOREIGN PATENT DOCUMENTS

| | | | | |
|---|---|---|---|---|
| WO | WO-2009090391 A1 | * | 7/2009 | ............. G06Q 30/06 |
| WO | WO-2021184933 A1 | * | 9/2021 | |
| WO | WO-2022226629 A1 | * | 11/2022 | |

OTHER PUBLICATIONS

"2. Clustering with KMEDOIDS, Clara and Common-Nearest-Neighbors." Scikit, 2019, scikit-learn-extra.readthedocs.io/en/stable/modules/cluster.html. (Year: 2019).*

*Primary Examiner* — Grace Huang
(74) *Attorney, Agent, or Firm* — Knobbe, Martens, Olson & Bear, LLP

(57) ABSTRACT

Systems and methods are provided for generating custom garment patterns for producing clothing sized to fit any newly input human body representation. A set of reference sample bodies may be selected for which custom designed garment patterns are then obtained. Once reference patterns are obtained, a custom garment pattern for a particular new body may be automatically created by blending two or more of the reference patterns. For example, the neighboring reference bodies to the new body may be identified within a (Continued)

low-dimensional embedding space, and interpolation of garment parameters for the previously designed garment patterns for these reference bodies may be performed to produce a custom garment pattern.

18 Claims, 6 Drawing Sheets

(56) References Cited

U.S. PATENT DOCUMENTS

| | | | | |
|---|---|---|---|---|
| 7,496,526 | B2* | 2/2009 | Razumov | G06Q 30/0224 700/130 |
| 7,584,122 | B2* | 9/2009 | Kozinn | G06Q 10/087 705/37 |
| 8,073,560 | B1* | 12/2011 | Clardy | G06Q 10/10 700/132 |
| 8,115,771 | B2* | 2/2012 | Chi | G06T 13/20 345/475 |
| 9,128,988 | B2* | 9/2015 | Cheng | G06F 16/24578 |
| 9,881,226 | B1* | 1/2018 | Rybakov | G06F 16/583 |
| 9,949,519 | B2* | 4/2018 | Koh | A41H 3/007 |
| 10,026,176 | B2* | 7/2018 | Davidson | G06T 7/11 |
| 10,108,695 | B1* | 10/2018 | Yeturu | G06F 16/955 |
| 10,217,195 | B1* | 2/2019 | Agrawal | G06T 7/11 |
| 10,321,728 | B1* | 6/2019 | Koh | G06T 7/11 |
| 10,395,411 | B2 | 8/2019 | Black et al. | |
| 10,482,642 | B2* | 11/2019 | Choi | G06T 11/203 |
| 10,607,411 | B1* | 3/2020 | Pezzino | G06T 7/337 |
| 10,679,046 | B1* | 6/2020 | Black | G06V 40/23 |
| 10,776,417 | B1* | 9/2020 | Ravichandran | G06N 5/046 |
| 10,918,150 | B2* | 2/2021 | Koh | G05B 19/4097 |
| 10,924,503 | B1* | 2/2021 | Pereira | H04L 63/20 |
| 10,984,342 | B2* | 4/2021 | Yu | G06N 7/01 |
| 11,131,045 | B2* | 9/2021 | deGuzman | G05B 19/4097 |
| 11,238,188 | B2* | 2/2022 | Sargent | A41H 3/04 |
| 11,430,246 | B2* | 8/2022 | Pei | G06Q 30/0621 |
| 11,676,194 | B2* | 6/2023 | Pande | G06Q 30/0643 705/26.61 |
| 11,720,942 | B1* | 8/2023 | Bazzani | G06Q 30/0613 705/26.41 |
| 11,725,314 | B2* | 8/2023 | Terai | D04B 35/00 700/132 |
| 2007/0250203 | A1* | 10/2007 | Yamamoto | G06T 19/00 700/98 |
| 2011/0078209 | A1* | 3/2011 | Rusberg | A41H 3/007 707/802 |
| 2013/0170715 | A1* | 7/2013 | Reed | G06F 18/00 382/111 |
| 2013/0215116 | A1* | 8/2013 | Siddique | G06Q 20/40 705/26.7 |
| 2014/0114620 | A1* | 4/2014 | Grinspun | A41H 3/007 703/1 |
| 2015/0134302 | A1* | 5/2015 | Chhugani | G06T 17/10 703/1 |
| 2019/0122424 | A1* | 4/2019 | Moore | G06T 7/62 |
| 2019/0231012 | A1* | 8/2019 | Daczewitz | G06Q 30/0641 |
| 2020/0402126 | A1 | 12/2020 | Choche et al. | |
| 2021/0274874 | A1* | 9/2021 | Atmanspacher | A61B 5/1079 |
| 2022/0053863 | A1* | 2/2022 | Chandra | G05B 19/042 |
| 2022/0087352 | A1* | 3/2022 | Wilcox | A41D 1/06 |
| 2022/0237879 | A1* | 7/2022 | Wu | G06T 15/04 |
| 2022/0361613 | A1* | 11/2022 | Oh | G06F 30/12 |
| 2023/0024666 | A1* | 1/2023 | Dhana | G06T 7/12 |
| 2023/0036395 | A1* | 2/2023 | Kuehn | A41H 3/007 |

* cited by examiner

CUSTOM GARMENT PATTERN BLENDING BASED ON BODY DATA

BACKGROUND

Generally described, the task of generating instructions to manufacture garments according to traditional methods often involves generating a tech pack, where the tech pack typically comprises a specification sheet for a base size of a garment and a grading sheet which is used for transforming the base size into other standard sizes (such as small, medium, and large). Accordingly, typical existing pattern grading techniques for manufacturing garments in different sizes are not well suited to generating truly made-to-measure clothing, where a given customer's body may differ significantly in proportions and measurements from any standard size for which a garment has been graded. For example, two people that are the same height and weight may nonetheless differ significantly in their body proportions, such as one person having a smaller waist but larger hips than the other person. In such an instance, standard grading techniques may result in garments that do not fit either person particularly well.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1:
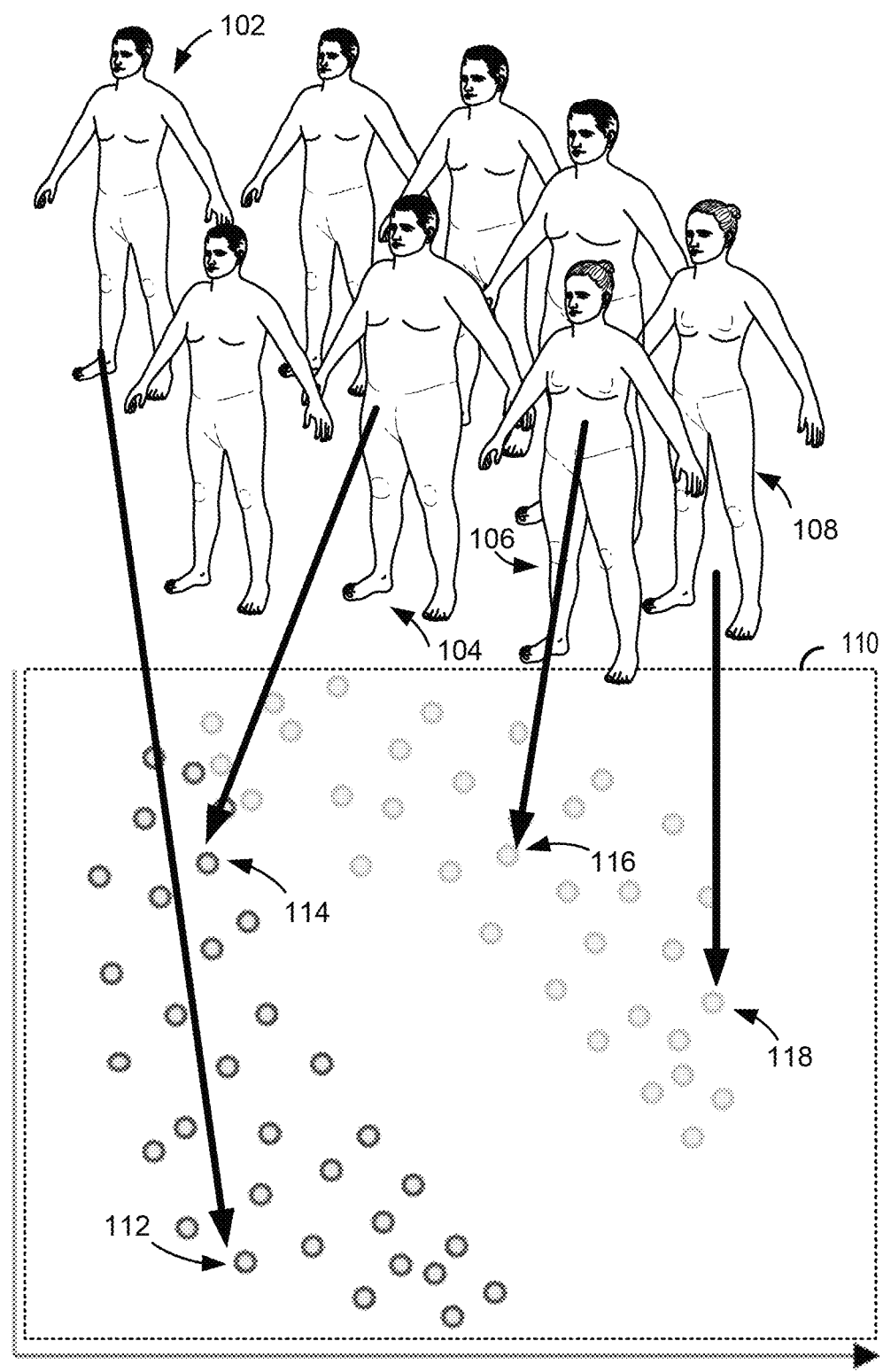
FIG. 1 is an illustrative visualization of a set of high-dimensional representations of human bodies of various body proportions as embedded in a lower-dimensional embedding space.

Aspects of the present disclosure address the problem of mapping human body shape to custom garment patterns for made-to-measure clothing production. In many existing workflows, garment designers design garment patterns for a small number of body shapes by using manual grading techniques. Such a process is difficult to scale to different body types and measurements across different garments. In contrast, methods described herein may be used to automate and accelerate garment pattern grading in order to automatically generate custom garment patterns for individual customers based on their specific individual body measurements. These custom garment patterns may then be used, using existing physical garment production techniques, to physically manufacture a custom garment sized to fit a particular person's body.

While aspects of the present disclosure may rely in part on well-designed reference patterns that are manually graded or designed by human designers, the designers according to methods described herein may be prompted by the system described herein to create garment patterns to fit specific, non-standard representative bodies or body shapes that are selected by a computing system via specific methods described herein. The system may learn a low-dimensional embedding function from a large number of 3D body shapes (e.g., thousands of bodies). Given a new body shape (such as a personalized 3D mesh or other 3D body data approximating the body of an actual customer), and a learnt embedding function, a system described herein may map the new body in a low-dimensional embedding space and identify neighboring reference bodies in the low-dimensional embedding space. The specific unique body shape of the customer or other input body can then be represented as an interpolation of its nearest neighboring reference body shapes. Accordingly, a custom garment pattern may be generated at least in part by performing interpolation of garment parameters among reference garment patterns previously designed for the neighboring reference bodies. For example, one example method of interpolation that may be applied is linear simplex-based interpolation using barycentric weights. This reduces garment designer time by restricting their focus to a relatively small number of reference patterns (e.g., roughly 10-20 reference bodies in some embodiments) and provides a more scalable solution to the problem of automatic garment grading for custom garment production than prior approaches.

More particularly, in one embodiment, a system described herein may learn an embedding function that represents an input high-dimensional human body in a lower-dimensional embedding space, where this embedding function may be learned based on a potentially large amount of higher-dimensional body data spanning a large range of body sizes. The system may then apply the embedding function to a first set of high-dimensional representations of human bodies to generate a first set of lower-dimensional human body representations. The system may then select a set of reference bodies from among the first set of lower-dimensional human body representations, where the reference bodies may be selected based on criteria such as (a) sufficient spanning of the human body dataset to avoid or minimize shape extrapolation, and (b) placing more reference samples in those regions where the function from body shape to garment patterns exhibits high curvature. The system may then request that one or more garment designers create, for each selected reference body, a garment pattern defining an instance of a garment with dimensions sized to fit the individual reference body. Once these reference garment patterns are designed, the system may store an association between each of these reference garment patterns and a corresponding reference body.

After the garment patterns for the reference patterns are created, the system may be configured to accept requests to create custom garment patterns for new customers or users. For example, the system may receive an indication that a user is interested in purchasing a custom-tailored version of the garment. The system may then receive data defining a high-dimensional representation of the body of the user, as will be further described below, and may generate a lower-dimensional embedding of the high-dimensional representation of the body of the user using the previously learned embedding function. The system may then select two or more reference bodies with respect to the user, where these may be the k-nearest reference bodies to the user's body representation in the lower-dimensional embedding space. The system may then retrieve, from an electronic data store, the reference garment patterns previously created for (and associated with) each of the two or more reference bodies selected with respect to the user (e.g., the neighboring reference bodies in the embedding space). The system may then generate a custom garment pattern for producing the custom-tailored version of the garment for the user by performing interpolation of garment parameters among the selected reference garment patterns.

FIG. 1 is an illustrative visualization of a set of high-dimensional representations of human bodies of various body proportions as embedded in a lower-dimensional embedding space 110. The high-dimensional body representations depicted in FIG. 1, such as 3D body representations 102, 104, 106 and 108, may be represented in data files as detailed 3D mesh models representing a wide variety of human body measurements (such as thousands of different bodies, in some embodiments). In some embodiments, these 3D body representations may be generated from a deformable human body model, such as the Skinned Multi-Person Linear ("SMPL") model, based on received or inferred body measurements of real people. The SMPL model and its output body meshes will be further described below with respect to FIG. 4A. As illustrated, these initial 3D body representations may include male and female bodies in a wide range of body mass, height, weight, and body proportions, which may generally reflect the variety of bodies in a real world population, such as customers or potential customers of a made-to-measure garment manufacturer or retailer.

A computing system described herein may learn an embedding function to generate lower-dimensional embeddings of the higher-dimensional body representations (such as 3D body representations 102, 104, 106 and 108, among many others) in an embedding space in which the distance between lower-dimensional body representations generally reflects the extent of similarity between the represented bodies. As shown in FIG. 1, the embedding 112 in the lower-dimensional embedding space may represent (and be generated using the learned embedding function based on) the higher-dimensional body shown as 3D body representation 102. Similarly the lower-dimensional embedding 114 may be generated using the embedding function applied to higher-dimensional body representation 104, the lower-dimensional embedding 116 may be generated using the embedding function applied to higher-dimensional body representation 106, and the lower-dimensional embedding 118 may be generated using the embedding function applied to higher-dimensional body representation 108. As illustrated and will be further discussed below, the embedding function may be learned such that relatively similar shaped bodies (e.g., bodies likely to have similar garment patterns fit them) are close to each other in the embedding space 110. Conversely, two bodies that are significantly different than each other in the high-dimensional space will be relatively far apart in the learned lower-dimensional embedding space 110. For example, body 104, which may have a significantly larger waist, thighs and many other proportions than body 102, may be represented in the lower-dimensional embedding space 110 by an embedding or vector 114 that is relatively far from the embedding or vector 112 that represents body 102.

There are a number of known techniques for dimensionality reduction in order to learn the embedding function utilized to project the 3D bodies shown in FIG. 1 into the lower-dimensional embedding space 110. For example, the lower-dimensional embedding for a 3D body can be derived from SMPL body parameters, SMPL body meshes, or a set of body measurements, in conjunction with known dimensionality reduction techniques. As one example, the t-distributed Stochastic Neighbor Embedding ("t-SNE") or other nonlinear dimensionality reduction technique may be utilized to learn embeddings that retain not only global variance but also local variance among the bodies sampled. As is known, t-SNE is a machine learning algorithm that generally focuses on retaining the structure of neighbor points, such that similar samples in the higher-dimensional space (such as detailed 3D body meshes in embodiments of the present disclosure) will be near each other in the lower-dimensional embedding space.

Figure 2:
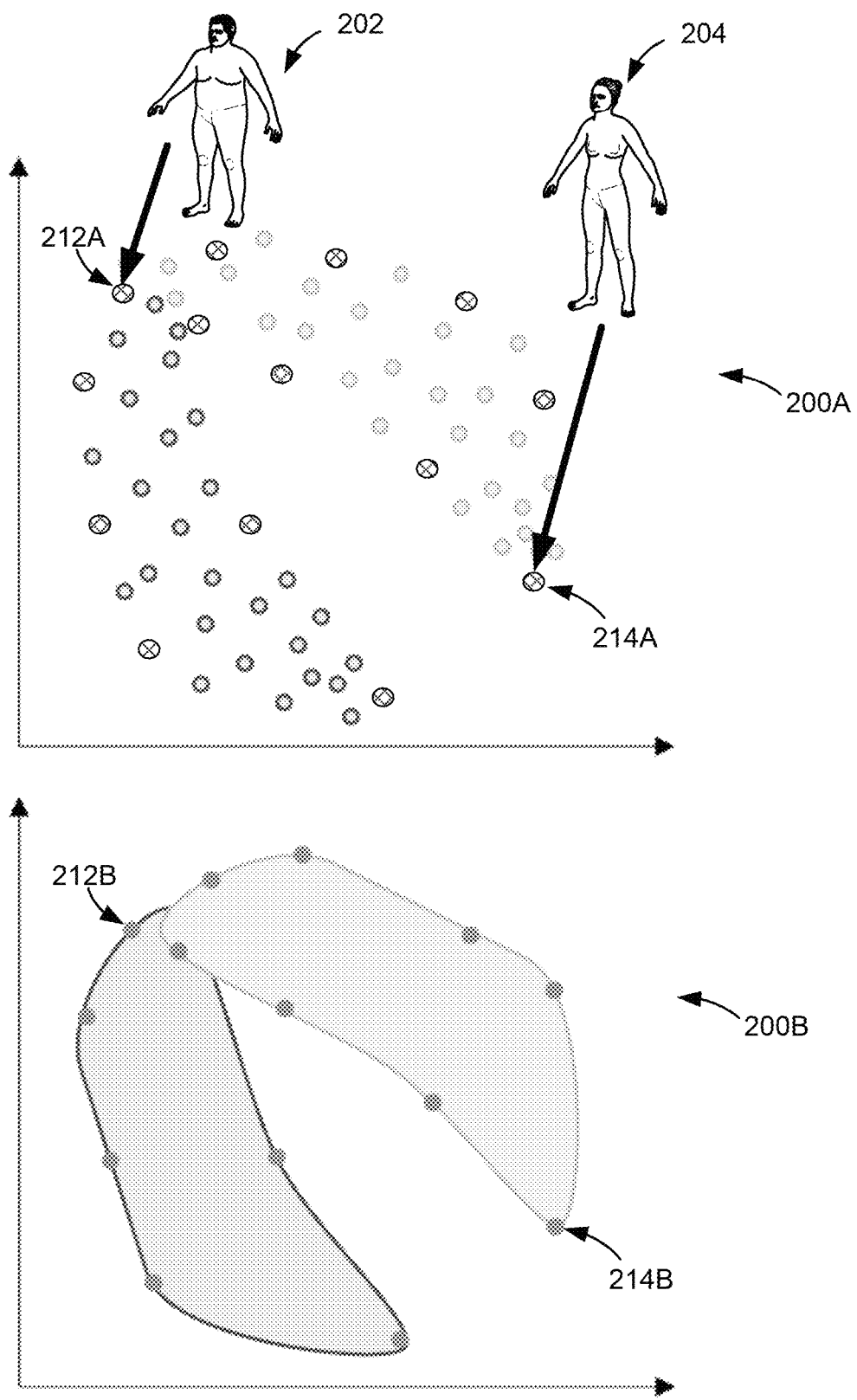
FIG. 2 provides visual representations of a set of reference bodies selected from a larger set of bodies embedded in a low-dimensional embedding space.

FIG. 2 provides visual representations of a set of reference bodies selected from a larger set of bodies embedded in a low-dimensional embedding space. The bodies represented in FIG. 2 by points having a cross-hatching pattern in the embedding space 200A (and are then the only points shown in the second embedding space visualization 200B) may be reference bodies that the computing system selects according to methods that will be further described below. These reference bodies, such as those represented by points 212A and 214A in embedding space 200A (and represented again as 212B and 214B, respectively, in the second embedding space visualization 200B of the same embedding space) may have been selected by the computing system from a much larger set of bodies populating the embedding space 200A (only a portion of which may be shown in the illustrative visualization of FIG. 2).

In some embodiments, as will be further discussed below, criteria for selecting these reference bodies or reference samples may include (a) achieving sufficient spanning of the human body dataset to avoid and/or minimize shape extrapolation, and/or (b) placement of relatively more reference samples in regions of the embedding space where the function from body shape to garment patterns exhibits high curvature. The latter may be derived, as an example, via a combination of designer domain knowledge and statistical analysis of existing body-garment paired data. In the illustrated example of FIG. 2, the reference bodies may be selected based on the convex hull of the embedded points in the lower-dimensional embedding space 200A, as visually represented in visualization 200B (showing that the larger set of bodies all fall within the shaded polygonal regions with vertices defined by the selected references bodies). In some embodiments, separate convex hulls may be identified for different groupings or types of bodies, such as male and female bodies. In FIG. 2, one sample male reference body 202 is shown (as represented in the lower-dimensional embedding space 200A by point 212A) and one sample female reference body 204 is shown (as represented in the lower-dimensional embedding space 200A by point 214A).

Figure 3:
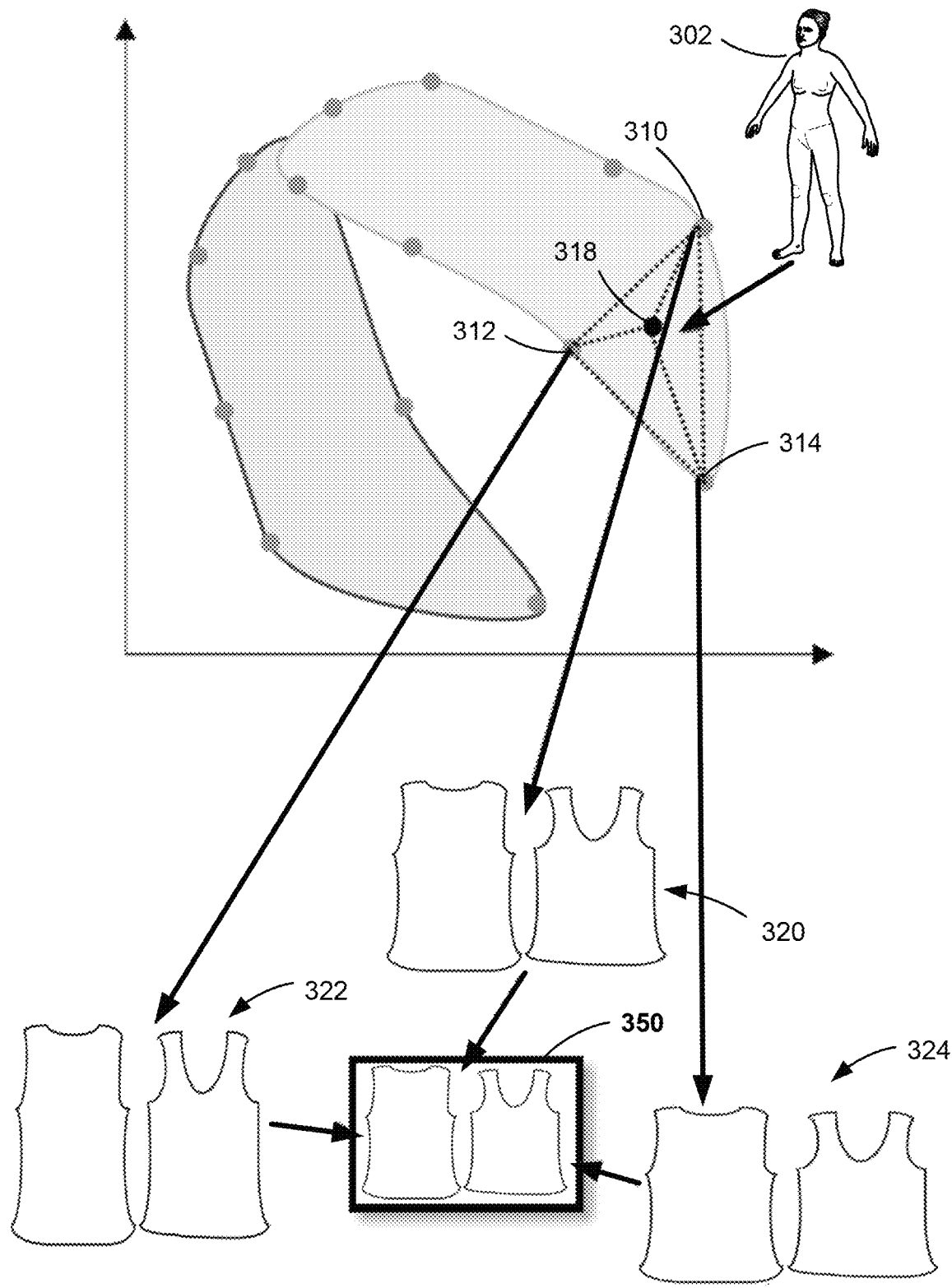
FIG. 3 is an illustrative visualization of a new body representation and its neighboring reference bodies in a low-dimensional embedding space, along with a resulting custom garment pattern generated based on garment patterns previously created for the neighboring reference bodies.

FIG. 3 is an illustrative visualization of a new body representation 302 (shown as embedding 318 in the lower-dimensional embedding space) and its neighboring reference bodies (illustrated as embeddings 310, 312, and 314 in the low-dimensional embedding space), along with a resulting custom garment pattern 350 generated based on garment patterns previously created for the neighboring reference bodies. The body 302 may be generated from newly provided body measurements of a particular customer who is interested in purchasing a custom fitted garment to be produced. As illustrated, reference bodies represented by points 310, 312, and 314 may have been identified by the system as the nearest reference bodies to the customer's embedding 318 within the embedding space, such as using techniques that will be further described below. These reference bodies 310, 312, and 314 may have previously had custom designed garment patterns 320, 322, and 324, respectively, designed to fit them by human designers. A new custom garment pattern 350 may then be generated by the system by blending or interpolating garment parameters (such as the relative location of coordinate points defining the panel edges of the garment) of the selected sample patterns 320, 322, and 324, as will be further described below.

Figure 4A:
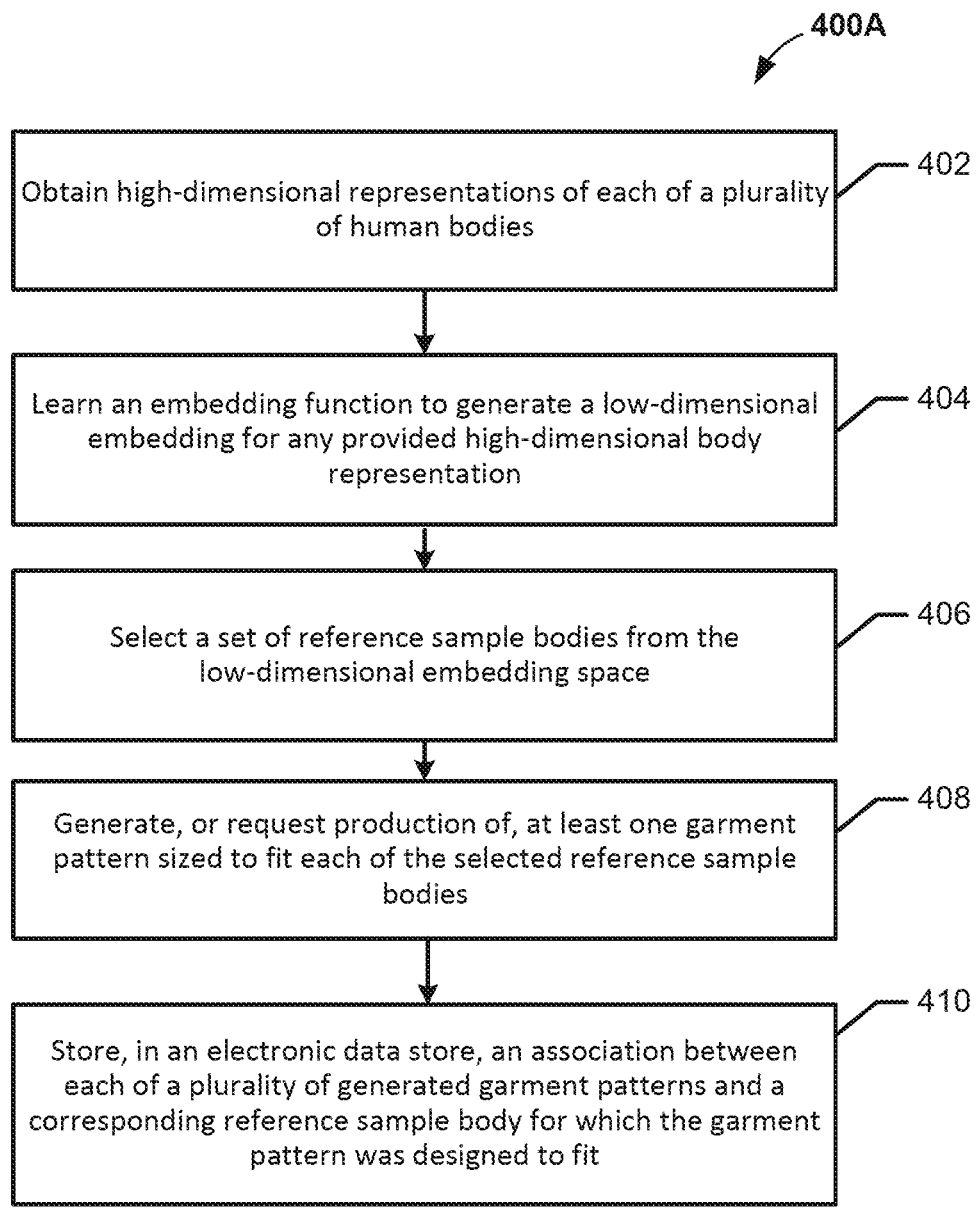
FIG. 4A is a flow diagram of an illustrative method for selecting reference sample bodies for creation of associated garment patterns, according to some embodiments.

FIG. 4A is a flow diagram of an illustrative method 400A for selecting reference sample bodies for creation of associated garment patterns, according to some embodiments. The illustrative method 400A may be performed by a computing system, such as computing system 502 that will be described further below.

The illustrative method 400A begins at block 402, where the computing system obtains 3D representations or other high-dimensional representations of each of a plurality of human bodies. Relative to the later lower-dimensional embedding space that will be described further below, the body data initially obtained for each body may be considered high-dimensional body data. For example, the high-dimensional body data defining a given body may include a large number of 3D points, measurements and/or detailed 3D mesh data. In some embodiments, the high-dimensional body data may include 30-100 or more different measurements (such as arm length, waist size, distance from waist to ground, etc.). The initial high-dimensional body data may be represented, for example, in dozens or even thousands of dimensions (such as each vertex in a 3D mesh occupying a different dimension in the initial body representation received at block 402). The set of 3D bodies or other high-dimensional body representations may include a wide range of human body sizes, each represented as a 3D mesh model, in some embodiments. In some embodiments, a deformable human body model, such as the Skinned Multi-Person Linear ("SMPL") model, may be used to generate a set of 3D bodies of varied body shapes, such as in the form of a 3D mesh. For example, the set of bodies may be generated using the SMPL model based in part on captured body measurements of real customers (e.g., in order to reflect the general range of body measurements, BMI, weight, height, etc. of a given customer base), or may be generated automatically to cover a wide range of possible body measurements.

The SMPL model is a skinned vertex-based model that accurately represents a wide variety of 3D human body shapes in natural human poses, which deform naturally with pose and exhibit soft-tissue motions like those of real humans. The parameters of the model are learned from data including a rest pose template, blend weights, pose-dependent blend shapes, identity-dependent blend shapes, and a regressor from vertices to joint locations. The SMPL model enables training its entire model from aligned 3D meshes of different people in different poses. More information regarding implementation of an SMPL model can be found in U.S. Pat. No. 10,395,411 (hereinafter "the '411 patent"), to Black et al., issued Aug. 27, 2019, entitled "SKINNED MULTI-PERSON LINEAR MODEL," which is incorporated herein by reference.

As described in the '411 patent, using the SMPL model to generate a 3D human body model in a given instance may generally include, in one embodiment, obtaining a shape-specific template of a body model defined by a number of vertices (where the shape-specific template may have been generated by applying a shape-specific blend shape to vertices of a template shape), applying a pose-dependent blend shape to the vertices of the shape-specific template (e.g., displacing the vertices of the shape-specific template into a pose- and shape-specific template of the body model), and then generating a 3D model articulating a pose of the body model based on the vertices of the pose- and shape-specific template of the body model. Thus, an SMPL-based model may be configured to receive input that includes a vector of shape parameters and a vector of pose parameters, which the SMPL model then applies with respect to a template 3D human model in order to generate a 3D human model that maps the shape and pose parameters to vertices.

Next, at block 404, the computing system may learn an embedding function configured to generate a low-dimensional embedding for any high-dimensional body representation that is provided as input to the embedding function. For example, as mentioned above, t-SNE or another non-linear dimensionality reduction technique may be utilized to learn embeddings that retain not only global variance but also local variance among the bodies sampled. Accordingly, t-SNE or a similar machine learning algorithm may be employed that is configured to generally retain the structure of neighbor points, such that similar samples in the higher-dimensional space (such as 3D body mesh data representing bodies that would wear relatively similar sized clothing) will be near each other in the lower-dimensional embedding space. In other embodiments, other dimensionality reduction approaches may be utilized, such as Principal Component Analysis ("PCA"), Independent Component Analysis ("ICA") or manifold learning.

At block 406, the computing system may select a set of reference sample bodies from the low-dimensional embedding space. In some embodiments, criteria for selecting these reference bodies or reference samples may include achieving sufficient spanning of the human body dataset to avoid and/or minimize shape extrapolation, and/or placing relatively more reference samples in regions of the embedding space where the function from body shape to garment patterns exhibits high curvature. A goal for determining how many reference bodies should be selected may generally be that it is a small enough number to enable relatively fast turn-around time for potential manual design of associated garment patterns for each of the sample reference bodies when any new garment is added to an electronic catalog, but large enough that points in the space fall within simplices formed by the reference points.

In one embodiment, the reference bodies may be selected by identifying a convex hull of the embedded points representing the various bodies in the lower-dimensional embedding space. This approach may ensure to a large extent that a new point would fall within a triangle, but triangles may be large and cover regions where the range is not sufficiently sampled. Alternatively, a hull and a subset of internal points within the hull may be used as reference bodies in order to reduce simplex size. This may ensure that interpolation happens over a smaller region, but introduces more reference points. In such an embodiment, the interior embedded points may be selected using k-medoids clustering based on the distribution of body shapes, among other options. In other embodiments, the reference bodies may be selected to include newly generated points or embeddings by averaging clustered measurements, such as using K-means clustering. For example, instead of directly selecting a reference point from the available set of bodies, a new average point can be computed based on neighborhoods to act as a reference.

In some embodiments, sample points (representing different bodies) may be selected based on local density and distances in the embedding space. For example, the shape of the function is less reliably captured by simplex in sparse regions, so the system may be configured to sample these regions more carefully when selecting a reference point. Domain knowledge on how body shape maps to patterns can be incorporated in the reference point selection. For example, the system may be configured to favor placing more reference points in regions of the embedding space where small changes in body shape can produce sizeable changes in garment patterns. Regardless of the reference body selection approach used, the system may use feedback from pattern remakes issued by customers indicating a significant correction to a garment pattern, by adding those bodies as a new reference point to the system's simplex interpolation, which should generally improve accuracy for future instances of generating custom sizes of that garment for bodies in the vicinity of the particular body shape in the embedding space.

At block 408, the computing system may generate, or request production of, at least one garment pattern sized to fit each of the selected reference sample bodies. This may include generating a request that is presented via a user interface to a garment designer. It will be appreciated that the particular garment type could be any of a large range of garment types, such as a particular designer's dress, t-shirt, dress shirt, jacket, skirt, etc. In some embodiments, a goal of the system may be that any particular garment that a customer is able to order in a made-to-measure manner has a reference pattern created to fit each of the reference sample bodies (or at least those of the customer population that is expected to order the given garment based on the garment type).

In some embodiments, the file format and content of each garment pattern may follow the digital file structures disclosed in U.S. Patent Application Publication No. 2020/0402126 (hereinafter "the '126 Publication"), to Choche et al., published Dec. 24, 2020, entitled "CUSTOM DIGITAL FILES FOR GARMENT PRODUCTION," which is incorporated herein by reference. For example, for a specific garment such as a shirt, a digital file serving as the garment pattern may define a plurality of panel objects to represent the components of the shirt. These components may include a front shirt panel object and a back shirt panel object to represent the front of the shirt and the back of the shirt respectively. In some embodiments, the computing system may generate a garment pattern by receiving and processing information that is selected or inputted by a human designer via a user interface, as further described in the '126 Publication. Data defined with respect to an individual panel object of a garment pattern may include, for example, a number of points in an x-y coordinate system. The individual points may be associated with one another to define edges of the panel. The edges and/or point locations themselves may each be defined in part by one or more equations or mathematical formulas (such as a formula regarding where one point should be placed relative to another point, or defining a Bezier curve for a curved edge between two points). These and other specific data definitions of a pattern garment are further described in detail with respect to the base digital files and custom digital files of the '126 Publication. Unlike certain digital files described in the '126 Publication however, the garment patterns utilized herein may not include grading or scaling formulas to alter sizing of a garment, but rather each garment pattern may only define sizing with respect to a single sized garment instance.

In some embodiments, a garment pattern may define a plurality of objects that each represent physical components used in production of a garment. In some embodiments, each panel of a garment may be associated with a number of attributes. For example, a front panel of a shirt may be associated with a unique panel identifier to identify that particular panel in the garment as well as a fabric identifier to represent the type of fabric to be used for constructing the front shirt panel. Each pattern may be stored in an object-oriented format (e.g., JavaScript Object Notation (JSON) format), in some embodiments. The file defining a garment patterns may further include sewing instructions dictating how seams represented by a seam object should stitch a first panel object and a second panel object together. Similarly, the file may also include one or more edge objects representing an edge corresponding to a seam, and in turn, a panel. Accordingly, a garment pattern may provide sufficient information and detail for the associated garment to be physically manufactured using known garment manufacturing techniques.

At block 410, the computing system may store, in an electronic data store, an association between each of a plurality of generated garment patterns and a corresponding reference sample body for which the garment pattern was designed to fit. For example, mapping data may be stored that associates a unique identifier of each reference sample body with a unique identifier or file location of an associated garment pattern that is stored as a digital file in an electronic data store.

Figure 4B:
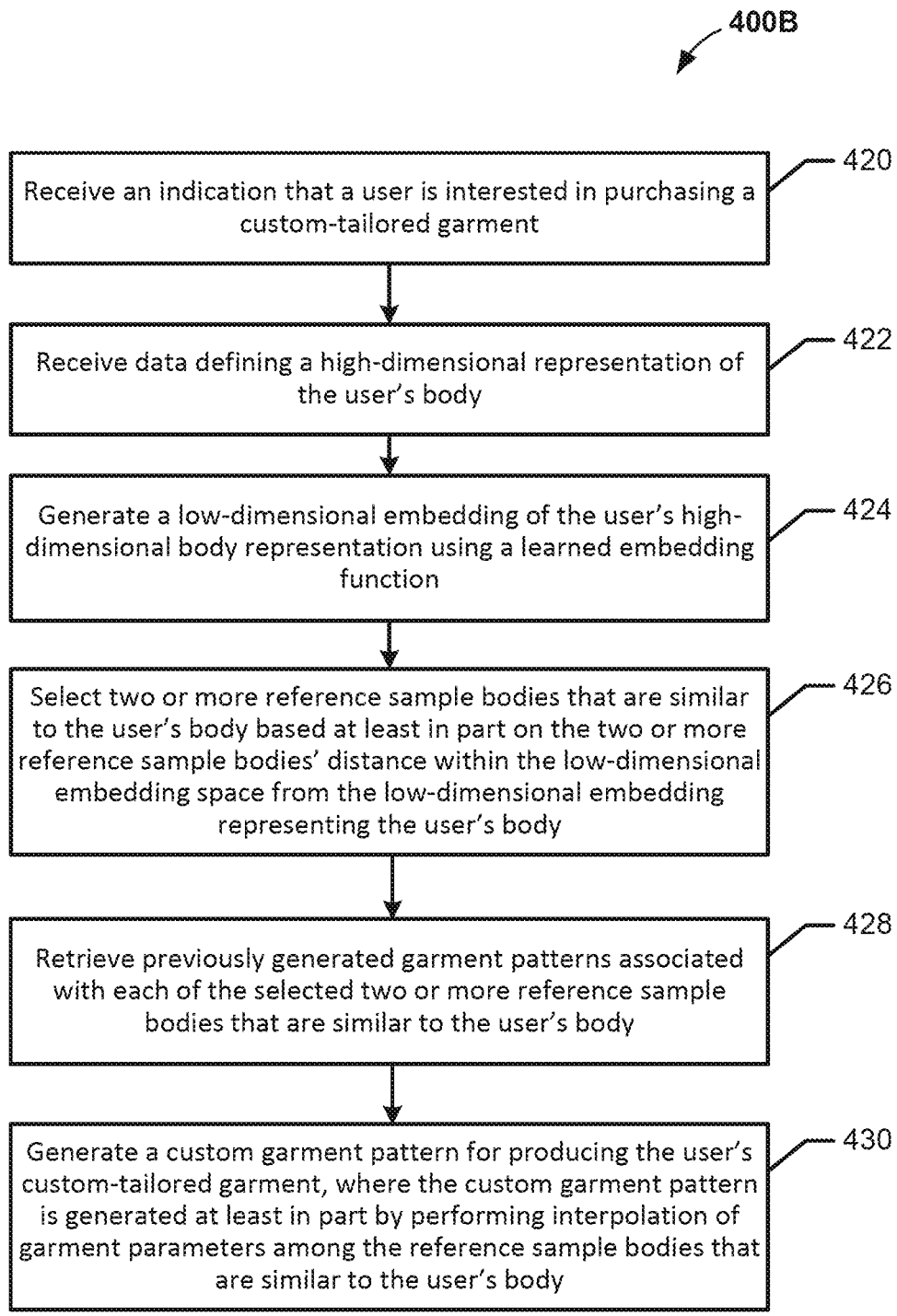
FIG. 4B is a flow diagram of an illustrative method for generating a custom garment pattern to fit a specific person based on previously created reference patterns associated with reference bodies that neighbor the specific person's body in an embedding space, according to some embodiments.

FIG. 4B is a flow diagram of an illustrative method 400B for generating a custom garment pattern to fit a specific person based on previously created reference patterns associated with reference bodies that neighbor the specific person's body in an embedding space, according to some embodiments. The illustrative method 400B may be performed by a computing system, such as computing system 502 that will be described further below. Method 400B may be performed by the same computing system or a different computing system than method 400A described above. For example, one computing system may be responsible for selecting the reference sample bodies for which sample garment patterns are created (such as described with respect to method 400A above), and a separate computing system may later be used (such as after those sample garment patterns are created by a designer) to respond to customer requests and generate custom blended patterns as will be described below with respect to method 400B.

At block 420, the computing system may receive an indication that a user is interested in purchasing a custom-tailored garment. This request may be received from a computing device of the user over a network (such as the Internet), or may be received from a server or other back-end system that handles the front-end communication with a user device. In response to receiving the indication, the method may proceed to block 422, where the computing system may receive or generate data defining a 3D representation or other high-dimensional representation of the user's body.

In some embodiments, the computing system or another system may generate 3D body data representing the user's body based on body measurements derived or inferred from a series of photos submitted by the user or captured by a camera of a user's computing device (such as images of the user captured via a guided user interface that instructs the user to stand in different poses in front of a device's camera). The computing system may receive digital photos (such as from the user's device over a network, such as the Internet) and extract or estimate the user's body measurements based on the submitted photos. For example, the computing system may predict body metrics of the user from the submitted photos using methods described in U.S. Pat. No. 10,679,046, entitled "MACHINE LEARNING SYSTEMS AND METHODS OF ESTIMATING BODY SHAPE FROM IMAGES," which is hereby incorporated by reference in its entirety herein. In other embodiments, a user may enter detailed body measurements or provide body data in some other manner.

Next, at block 424, the computing system may generate a low-dimensional embedding of the user's high-dimensional body representation using a previously learned embedding function. Methods for learning such an embedding function based on a large set of initial body data are described above. As described above, this low-dimensional embedding may be derived, in some embodiments, from higher-dimensional body parameters in conjunction with dimensionality reduction techniques such as t-SNE.

At block 426, the computing system may select two or more reference sample bodies, from among a plurality of reference sample bodies in the low-dimensional embedding space, that are similar to the user's body based at least in part on the two or more reference sample bodies' distance within the low-dimensional embedding space from the low-dimensional embedding representing the user's body. For example, in some embodiments, the k-nearest neighbors among the reference bodies in the embedding space may be computed for the user's embedding. Additional considerations in selecting neighboring reference bodies have been discussed above.

Next, at block 428, the computing system may retrieve previously generated garment patterns associated with each of the selected two or more reference sample bodies that are similar to the user's body (e.g., the neighboring reference bodies). The computing system may then, at block 430, generate a custom garment pattern for producing the user's custom-tailored garment, where the custom garment pattern may be generated at least in part by performing interpolation of garment parameters among the reference sample bodies that are similar to the user's body. In some embodiments, the interpolation applied to the garment parameters (such as to the coordinate positons of the points defining the shape or edges of the garment panels in each pattern) and/or body parameters may be linear simplex interpolation using barycentric weights, for example. Non-limiting example of interpolation methods that may be suitable in various embodiments include simplex interpolation using barycentric coordinates, inverse-distance-weighted interpolation (such as Shepard's method), or regression-kriging.

In some embodiments, the system may apply post-processing steps after an initial blended pattern is created for the user based on interpolation or similar methods discussed above. For example, if the initial blended pattern has non-smooth panel edges or similar inconsistencies in shape of a portion of the garment, the system may adjust certain points of the custom garment pattern to improve smoothness of at least one portion of the garment (such as an edge of a panel in the pattern). As another example, the system may scale the initial blended pattern in length or width. This may occur, for example, in embodiments in which reference bodies have been normalized by height, and height (or length) adjustments are then made to a garment to correspond to a user's height via a scaling factor determined from the normalized height value. Such scaling may also be applied to the initial blended pattern if the neighboring sample patterns are not particularly close in height. Post-processing may additionally include checking that seams that are intended to be sewn together between two panels are the same length, and adjusting one to match the other if not.

In some embodiments, the system may determine separate neighboring reference samples for different portions of a garment or portions of the human body. For example, for a dress, the system may be configured in some embodiments to find the nearest neighboring sample upper body portions to the given user's upper body, and separate nearest neighboring lower body portions to the given user's lower body. In such embodiments, a lower-dimensional representation of the user's upper body may be generated, along with a separate lower-dimensional representation of the user's lower body. In such embodiments, the sample patterns may be split between sample panels to be positioned on the upper body and separate sample panels to be positioned on the lower body. The final custom garment pattern for a given user may then be a combination of a blended upper body portion of a garment and a blended lower body portion of the garment.

Once the custom garment pattern is generated, the illustrative method 400B may end. After implementing method 400B, the computing system may provide an indication to another system to take one or more actions. For example, the computing system may provide an indication to a front-end retail system to communicate to the user that the custom garment is ready for manufacturing, or may provide the custom garment pattern to a manufacturing system for physical production of the garment using the custom garment pattern.

Figure 5:
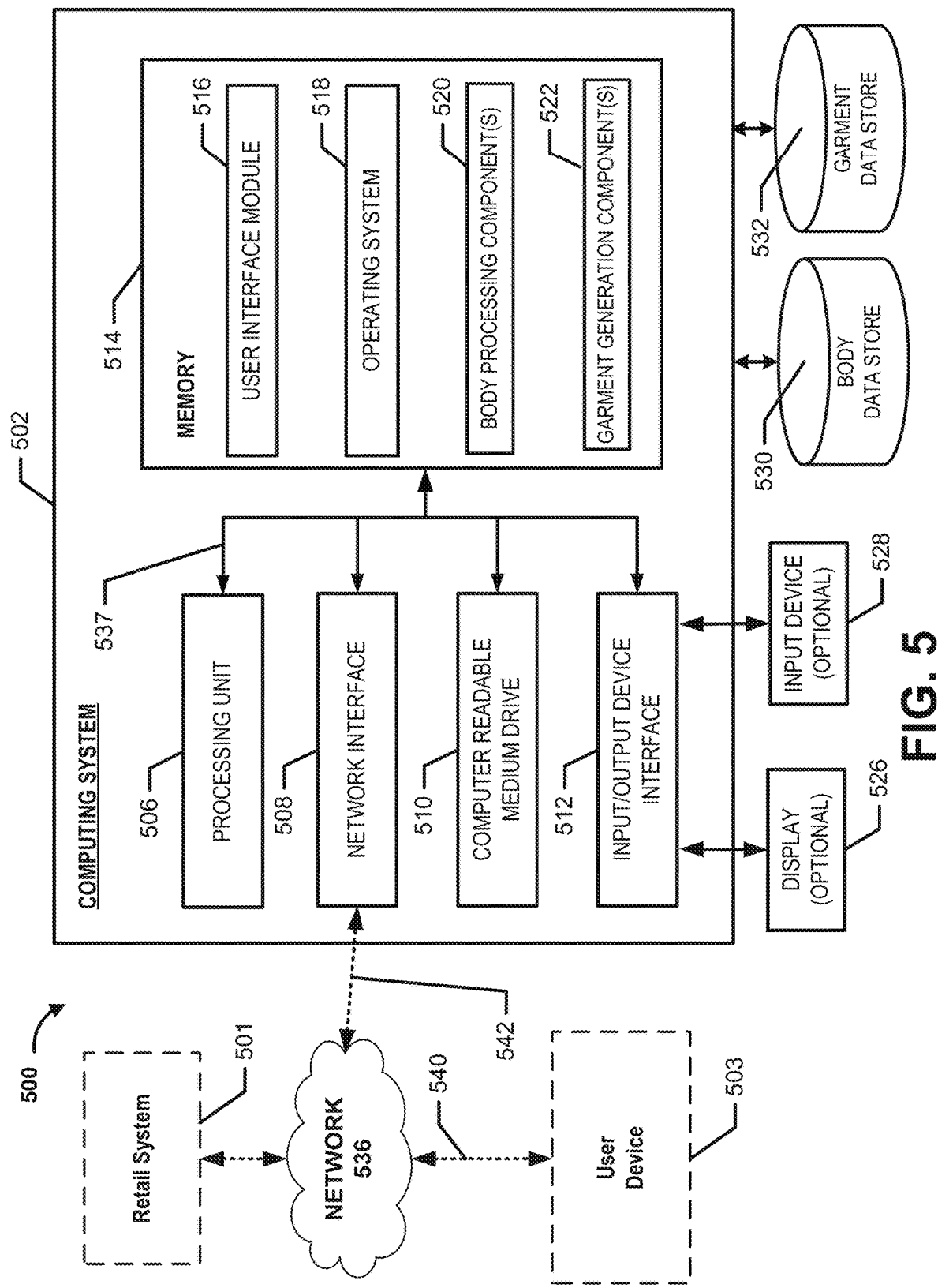
FIG. 5 is a block diagram depicting an illustrative architecture for a computing system that may implement one or more of the features described herein.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on a user device 503.

In some embodiments, the memory 514 may include one or more body processing components 520 and garment generation components 522, which may be executed by the processing unit 506 to perform operations according to various embodiments described herein. The modules or components 520 and/or 522 may access the body data store 530 and/or garment data store 532 in order to retrieve data described above (such as 3D body representations and garment patterns) and/or store data. The data stores 530 and/or 532 may be part of the computing system 502, remote from the computing system 502, and/or may be a network-based service.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with an optional retail system 501, which may be used by the computing system 502 to retrieve garment data, user body data, and/or other data.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a non-transitory data store that stores initial representations of three-dimensional ("3D") body data of each of a plurality of human bodies; and
   at least one computing device configured with computer-executable instructions that, when executed, cause the at least one computing device to:
   based at least in part on the initial representations, learn an embedding function that represents an input 3D human body in a lower-dimensional embedding space, wherein proximity between two or more individual bodies represented within the lower-dimensional embedding space corresponds with similarity of body shapes of the two or more individual bodies;
   apply the embedding function to a first set of the initial representations to generate a first set of lower-dimensional human body representations;
   select a set of reference bodies, wherein the set of reference bodies are selected as a subset of the first set of lower-dimensional human body representations and span at least a majority of the lower-dimensional embedding space that is populated by the first set of lower-dimensional human body representations;
   obtain, for each individual reference body in the set of reference bodies, a garment pattern defining an instance of a garment with dimensions sized to fit the individual reference body;
   store, in an electronic data store, an association between each of a plurality of obtained garment patterns for the garment and a corresponding reference body;
   receive an indication that a user is interested in purchasing a custom-tailored version of the garment;
   receive data defining a 3D representation of the body of the user;
   generate a lower-dimensional embedding of the 3D representation of the body of the user using the embedding function;
   select two or more reference bodies with respect to the user, wherein the two or more reference bodies are selected based on distances from the two or more reference bodies to the lower-dimensional embedding of the 3D representation of the body of the user within the lower-dimensional embedding space;
   retrieve, from the electronic data store, reference garment patterns associated with each of the two or more reference bodies selected with respect to the user; and
   generate a custom garment pattern for producing the custom-tailored version of the garment for the user, wherein the custom garment pattern is generated at least in part by performing interpolation of garment parameters among the reference garment patterns.

2. The system of claim 1, wherein the selecting of the set of reference bodies from the first set of lower-dimensional human body representations comprises determining a convex hull of embedded points corresponding to the set of reference bodies in the lower-dimensional embedding space.

3. The system of claim 1, wherein the two or more reference bodies with respect to the user are selected using a k-nearest neighbors algorithm (k-NN).

4. The system of claim 1, wherein the interpolation of garment parameters among the two or more reference bodies comprises applying at least one of simplex interpolation using barycentric coordinates, inverse-distance-weighted interpolation, or regression-kriging.

5. A computer-implemented method comprising:
   receiving a request to produce a custom-tailored version of a garment for a user;
   obtaining body data defining a representation of the body of the user;
   generating, from the body data, a lower-dimensional embedding of the representation of the body of the user in an embedding space, wherein the embedding space has less dimensions than the body data, wherein proximity between two or more individual bodies represented within the embedding space corresponds with similarity of body shapes of the two or more individual bodies;
   selecting, from a plurality of reference bodies represented in the embedding space, two or more reference bodies with respect to the user, wherein the two or more reference bodies are selected based on distances from the two or more reference bodies to the lower-dimensional embedding of the representation of the body of the user within the embedding space;
   retrieving, from an electronic data store that stores a plurality of garment patterns associated with the plurality of reference bodies, reference garment patterns associated with the two or more reference bodies selected with respect to the user; and
   generating a custom garment pattern for producing the custom-tailored version of the garment for the user, wherein the custom garment pattern is generated at least in part by performing interpolation of garment parameters among the reference garment patterns.

6. The computer-implemented method of claim 5 further comprising:
   learning an embedding function based on initial representations of 3D body data of a plurality of human bodies including the two or more individual bodies, wherein the lower-dimensional embedding of the representation of the body of the user in the embedding space is generated using the embedding function; and
   selecting the plurality of reference bodies as a subset of the plurality of human bodies.

7. The computer-implemented method of claim 6, wherein the plurality of reference bodies are selected to span at least a majority of the embedding space that is populated by the plurality of human bodies.

8. The computer-implemented method of claim 6, wherein the plurality of reference bodies are selected based on both local density and distances among embedded points representing the plurality of human bodies in the embedding space.

9. The computer-implemented method of claim 6, wherein selecting the plurality of reference bodies within the embedding space comprises determining a convex hull of embedded points corresponding to the plurality of reference bodies in the embedding space.

10. The computer-implemented method of claim 9, wherein the plurality of reference bodies further includes bodies represented by interior embedded points within the convex hull.

11. The computer-implemented method of claim 10, wherein the interior embedded points are selected using k-medoids clustering.

12. The computer-implemented method of claim 5, wherein the two or more reference bodies with respect to the user are selected using a k-nearest neighbors algorithm (k-NN).

13. The computer-implemented method of claim 5, wherein the generating of the custom garment pattern further comprises, subsequent to performing the interpolation of garment parameters among the reference garment patterns, adjusting a plurality of points of the custom garment pattern to improve smoothness of at least one edge of the custom garment pattern.

14. A system comprising:
- a non-transitory data store that stores a plurality of garment patterns that are each associated with a different human body among a plurality of reference bodies; and
- at least one computing device configured with computer-executable instructions that, when executed, cause the at least one computing device to:
  - receive a request to produce a custom-tailored version of a garment for a user;
  - obtain body data defining a representation of the body of the user, wherein the representation of the body of the user comprises a first number of dimensions;
  - generate, from the body data, a lower-dimensional embedding of the representation of the body of the user in an embedding space, wherein the lower-dimensional embedding has less dimensions than the first number of dimensions, wherein proximity between two or more individual bodies represented within the embedding space corresponds with similarity of body shapes of the two or more individual bodies;
  - select, from among the plurality of reference bodies as represented in the embedding space, two or more reference bodies with respect to the user, wherein the two or more reference bodies are selected based on distances from the two or more reference bodies to the lower-dimensional embedding of the representation of the body of the user within the embedding space;
  - retrieve, from the non-transitory data store, reference garment patterns associated with the two or more reference bodies selected with respect to the user; and
  - generate a custom garment pattern for producing the custom-tailored version of the garment for the user, wherein parameters of the custom garment pattern are determined based at least in part on parameters of each of the reference garment patterns.

15. The system of claim 14, wherein the generating of the custom garment patterns comprises performing interpolation of garment parameters among the reference garment patterns.

16. The system of claim 14, wherein at least a subset of the plurality of garment patterns are normalized by body height, and wherein the generating of the custom garment pattern further comprises applying a scaling factor that is based on a height of the user.

17. The system of claim 14, wherein an individual pattern of the plurality of garment patterns comprises a plurality of coordinate points and associated mathematical formulas.

18. The system of claim 14, wherein each of the plurality of garment patterns associated with the plurality of reference bodies have been designed to fit an associated human body among the plurality of reference bodies.

* * * * *